Dec. 12, 1950          F. A. SNELL          2,533,844

ANIMAL TRAP

Filed May 4, 1946

Francis A. Snell
Inventor

Patented Dec. 12, 1950

2,533,844

UNITED STATES PATENT OFFICE 2,533,844

ANIMAL TRAP

Francis A. Snell, Tinmouth, Vt.

Application May 4, 1946, Serial No. 667,359

8 Claims. (Cl. 43—83.5)

This invention relates to animal traps and, more particularly, to that class of trap in which a single hinged jaw cooperates with a base to catch and hold the animal.

Traps of this sort, as heretofore constructed, have been set by holding the jaw back against its spring with one hand while, with the other hand, the user adjusted the latching mechanism. As the latching mechanism of the majority of traps has consisted of a jaw-restraining member cooperating with a trigger, the setting of the trap has generally required considerable manipulation and there has often been risk of the user getting his fingers caught in case the latch failed to hold. Furthermore, many traps have lacked sensitivity due to the friction of the sliding engagement between the trigger and the jaw-restraining member. This friction results from the fact that a considerable percentage of the spring load is applied to the latch, and the animal must press hard enough against the trigger to cause the engaged parts to slip while under this constant load.

With these difficulties in mind, I have invented a trap whose principal feature is that it is self-latching and can be set, if necessary, with one hand.

Another feature of my invention is a latching mechanism which operates on the principle of balanced forces and thus largely eliminates the friction of the usual type of spring-loaded latch.

A further feature of the invention is a means for adjusting the sensitivity of the trap.

Still another feature is the elimination of the risk of the user catching his fingers while setting the trap.

These and other features are disclosed in the following specification and in the accompanying drawing wherein.

Figure 1:
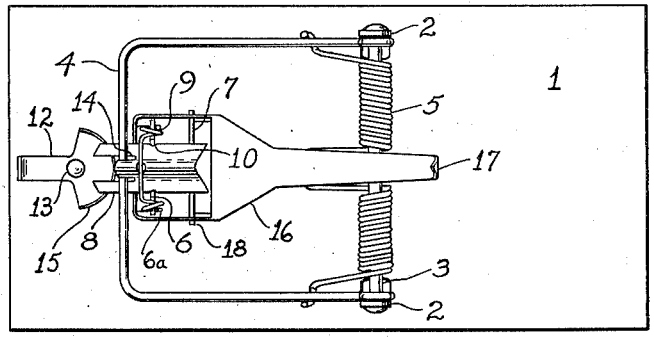
Figure 1 is a plan view of one embodiment of my invention showing the trap as set.

Referring now to the first four figures of the drawing which illustrate one embodiment of my invention, there is shown a base 1 which may be of any suitable material but is represented as made of stamped metal. This base has two ears 2 which serve as supports for shaft 3 on which is mounted jaw 4 and jaw-actuating spring 5, as has long been customary in the art.

Near one end of the base are two standards or supports 6 and 7 which may be suitably formed from the metal of the base by a lancing operation. Support 6 carries latch 8 which is a little trough-like piece of metal of inverted V section having notches 10 on its lower edges engaging with corresponding notches on the upper edge of support 6 so that the latch can rock freely upon its support without sliding off. Latch 8 is firmly held in such rocking engagement with support 6 by wire spring 9 which rests in notch 11 on the upper part of latch 8 and has hooks (or eyes) formed at its lower ends to engage with suitable holes in support 6. These holes are situated as far as possible below the upper edge of support 6 so that the line of action of the force exerted by spring 9 shall pass to one side of the point where latch 8 fulcrums on support 6, thereby producing a moment of rotation in latch 8 whenever it is tilted out of the horizontal position. The flexibility in the vertical direction required of spring 9 to permit the rocking or tilting of latch 8 is derived from its square-U-shape and also from side loops which are formed in the wire, as shown in the drawing.

Figure 2:
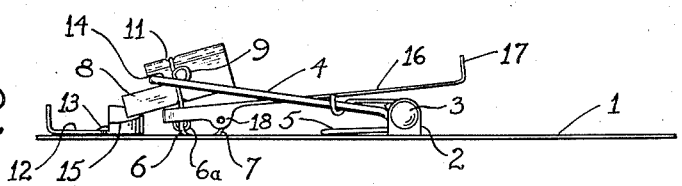
Figure 2 is a side view of Figure 1.
Figure 3:
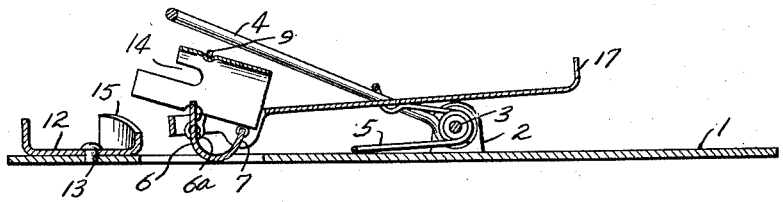
Figure 3 is a longitudinal sectional view of the same embodiment of my invention an instant after the trap has been sprung.
Figure 4:
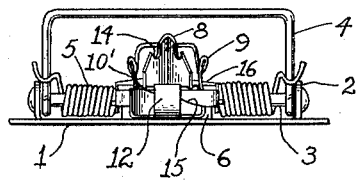
Figure 4 is an end view of the trap.

At one end of latch 8 is a notch 14 which engages and holds jaw 4 when the latch is rocked to the left, and releases the jaw when the latch is rocked to the right. It will be seen that when latch 8 is rocked independently of jaw 4 it will find a position of unstable equilibrium when it is approximately horizontal. When, however, the jaw is engaged in notch 14, the position of equilibrium occurs when the latch is rocked to the left as shown in Figures 1 and 2. Under this condition the leftward-rocking or rotating moment of spring 9 balances the restoring force of spring 5 acting upon jaw 4. In order to control the sensitivity of the trap, I provide an adjuster 12 which pivots about rivet 13 and has an upturned edge 15 of varying height for latch 8 to rest upon. Thus, by rotating adjuster 12, latch 8 is allowed to rock to the left more or less, as necessary, to produce any degree of stability or instability desired, and the trap is maintained in the set condition by a very slight residual friction which holds the two spring forces in balance.

In order to release the jaw it is only necessary that the animal should slightly disturb the aforesaid condition of equilibrium. This is accomplished by means of trigger 16 which is pivotally mounted on support 7 by means of projections 18 and has a bait hook 17 at its free end. The other end of trigger 16 has a cross-bar passing under latch 8 so that when the animal presses down upon the bait the cross-bar will press upwards against latch 8 and release the jaw.

The trap is set by merely swinging the jaw back and pressing it down against latch 8 and into notch 14 until latch 8 comes to rest on adjuster 12. Should the latch fail to hold on the first attempt there is no danger of pinching the fingers since it is unnecessary to manipulate the trigger as is required with most traps known to the prior art.

It will be seen that the principle of the above-described latch consists in a form of toggle action. This is the essence of my invention and is here shown and described in only one of a number of practical forms in which it might be embodied.

Figure 5:
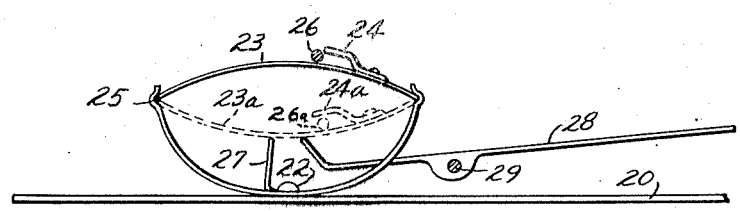
Figure 5 is a side view of the latch in another embodiment of my invention.

A somewhat different application of the principle is shown in Fig. 5 wherein 20 represents a portion of a base to which is riveted, at 22, an arcuate spring 21 having grooves 25 formed transversely near its ends. Into these grooves is set a lighter spring 23; the two springs being of such relative stiffness that spring 23 will be considerably bowed when it is in place. A hook 24 is secured to spring 23 near one end. There is also provided a stop 27 and a trigger 28 which is pivoted about a transverse, horizontal axis 29.

If now the jaw of the trap, represented in cross-section at 26, is pressed down upon spring 23, the spring will snap into the position shown by the dotted lines at 23a and hook 24 will assume the position 24a, thereby catching and retaining the jaw as indicated at 26a. To release the jaw it is only necessary to apply a slight upward force to spring 23 by means of trigger 28, pivoting about its axis 29. The sensitivity of the latching action is controlled by means of the height of stop 27 which limits the downward displacement of spring 23 and, consequently, the force required to restore it to its initial, or upward, position.

Accordingly, I wish it understood that the spirit of my invention is not limited by the embodiments here shown and described but only as defined in the following claims.

I claim:

1. A self-latching animal trap comprising a base member, a hinged jaw cooperating with said base member, a fulcrumed latching-piece adapted to be rotated either into or out of engagement with the jaw, stop means giving said latching-piece two positions of rest in one of which positions the latching-piece will engage the jaw and in the other of which positions it will release the jaw, spring means adapted to give the latching-piece a dead-center position between its positions of rest and to bias the latching-piece equally toward either position of rest when the dead-center position is passed, and a trigger adapted to initiate movement of the latching-piece from its jaw-engaging position to its jaw-releasing position.

2. A self-latching animal trap comprising a base member; a spring-actuated jaw cooperating with the base member; a spring-actuated latching-member having two stationary positions with a dead-center position between said stationary positions, said latching-member being adapted to engage the jaw in one of its stationary positions and to release the jaw when in its other stationary position, the spring actuation serving to bias said latching-member away from its dead-center position toward either of its stationary positions and to hold the jaw in the engaged or set position; means determining the aforesaid stationary positions; and a trigger adapted to initiate movement of the latching-member from its jaw-engaging position to its jaw-releasing position.

3. In an animal trap of the sort having a spring-actuated jaw, the combination of a fulcrumed latching-member adapted to engage the jaw in the set position, a spring so associated with and acting upon said member as to give it the characteristic of unstable equlibrium when in the set position, a trigger adapted to initiate release of the jaw by causing said latching-member to move from its position of equilibrium into its range of instability, and means to limit the motion of said latching-member about its fulcrum.

4. In an animal trap of the sort having a spring-actuated jaw, a latching mechanism comprising a pivoted latching-member adapted to rotate into engagement with the jaw when the jaw is pressed against said member, means to limit the pivotal motion of said member, a spring so associated with and acting upon said member as to produce a moment of rotation therein sufficient to hold the latched jaw in a condition of unstable equilibrium, and a trigger adapted to initiate release of the jaw by causing said latching-member to move from its position of equilibrium into its range of instability.

5. A self-latching animal trap comprising a base, a spring actuated jaw, a latching member having an axis of rotation in fixed relation to the base and adapted to be rotated into unstable latching engagement with the jaw when the jaw is pressed against said member, means to limit the rotation of said member, a trigger adapted to initiate rotation of said member in the counter-latching or releasing direction, and spring means so disposed with respect to said member that the force of the spring is directed substantially toward the aforesaid axis thereby to produce oppositely directed moments of rotation in said member on either side of a dead-center position, the extreme moment on one side of dead-center being sufficient to enable said latching member to hold the jaw in the set position and the extreme moment on the other side of dead-center sufficing to retain said latching member in a position of readiness for setting the trap.

6. An animal trap having in combination a base, a spring actuated jaw, a fulcrumed member having its fulcrum in fixed relation to the base and adapted to be rotated into unstable latching engagement with the jaw when said jaw is pressed against said member for the purpose of setting the trap, means to limit the rotation of said member, a spring so disposed with respect to said member and its fulcrum that said member has a dead-center position when the spring is in line with the fulcrum, the action of said member being to hold the jaw in unstable equilibrium when said member is rotated past dead-center in one direction and to release the jaw when said member is rotated past dead-center in the other direction, and a trigger adapted to upset the said condition of unstable equilibrium thereby causing release of the jaw.

7. An animal trap as set forth in claim 2 wherein the spring-actuated latching member comprises a spring normally flexed transversely of its length, and supporting means for the ends of said spring adapted to maintain said spring in the flexed condition by exerting endwise pressure upon it and also adapted to yield sufficiently to allow said spring to be flexed from one side of its neutral position to the other.

8. A self-latching animal trap comprising a base; a hinged and spring-actuated jaw cooperating with the base; a spring-actuated latch having two stationary positions with a neutral position of unstable equilibrium between said stationary positions; said latch being adapted to engage the jaw in one of its stationary positions and to release the jaw when in its other stationary position, the force of the spring serving to bias said latch away from its neutral position toward either of its stationary positions and to hold the jaw in the engaged or set position; means attached to the base for supporting said spring-actuated latch; motion-limiting means determining the aforesaid stationary positions of the latch; and a trigger adapted to initiate movement of the latch from its jaw-engaging to its jaw-releasing position.

FRANCIS A. SNELL.

REFERENCES CITED

The following references are of record in the file of this patent:

UNITED STATES PATENTS

| Number | Name | Date |
| --- | --- | --- |
| 2,059,238 | Howland | Nov. 3, 1936 |

FOREIGN PATENTS

| Number | Country | Date |
| --- | --- | --- |
| 278,837 | Great Britain | Oct. 20, 1927 |